US006327564B1

(12) United States Patent
Gelin et al.

(10) Patent No.: US 6,327,564 B1
(45) Date of Patent: Dec. 4, 2001

(54) SPEECH DETECTION USING STOCHASTIC CONFIDENCE MEASURES ON THE FREQUENCY SPECTRUM

(75) Inventors: Philippe Gelin; Jean-Claude Junqua, both of Santa Barbara, CA (US)

(73) Assignee: Matsushita Electric Corporation of America, Secaucus, NJ (US)

( * ) Notice: Subject to any disclaimer, the term of this patent is extended or adjusted under 35 U.S.C. 154(b) by 0 days.

(21) Appl. No.: 09/263,292

(22) Filed: Mar. 5, 1999

(51) Int. Cl.$^{7}$ .................................................... G01L 15/20

(52) U.S. Cl. .......................... 704/233; 704/240; 704/228; 704/234; 704/226

(58) Field of Search .................................... 704/233, 225, 704/215, 256, 258, 226, 227, 228, 234, 240

(56) References Cited

U.S. PATENT DOCUMENTS

| | | | | |
|---|---|---|---|---|
| 4,401,849 | | 8/1983 | Ichikawa et al. . | |
| 5,012,519 | * | 4/1991 | Adlersberg et al. | 704/226 |
| 5,323,337 | | 6/1994 | Wilson et al. . | |
| 5,579,431 | | 11/1996 | Reaves . | |
| 5,617,508 | | 4/1997 | Reaves . | |
| 5,732,392 | | 3/1998 | Mizuno et al. . | |
| 5,752,226 | * | 5/1998 | Chan et al. | 704/233 |
| 5,809,459 | * | 9/1998 | Bergstrom et al. | 704/223 |
| 5,826,230 | * | 10/1998 | Reaves | 704/233 |
| 5,907,624 | * | 5/1999 | Takada | 381/94.2 |
| 5,907,824 | * | 5/1999 | Tzirkel-Hancok | 704/241 |
| 5,950,154 | * | 9/1999 | Medaugh et al. | 704/226 |

OTHER PUBLICATIONS

Zhang ("Entropy based receiver for detection of random signals", ICASSP–88., 1988 International Conference on Acoustics, Speech and Signal processing, 1988, vol.5, pp. 2729–2732, Apr. 1988).*

Garner et al., ("Robust noise detection for speech detection and enhancement", Electronics Letters, vol.33, issue 4, pp. 270–271).*

* cited by examiner

*Primary Examiner*—William Korzuch
*Assistant Examiner*—Vijay B Chawan
(74) *Attorney, Agent, or Firm*—Harness, Dickey & Pierce, P.L.C.

(57) ABSTRACT

An accurate and reliable method is provided for detecting speech from an input speech signal. A probabilistic approach is used to classify each frame of the speech signal as speech or non-speech. The speech detection method is based on a frequency spectrum extracted from each frame, such that the value for each frequency band is considered to be a random variable and each frame is considered to be an occurrence of these random variables. Using the frequency spectrums from a non-speech part of the speech signal, a known set of random variables is constructed. Next, each unknown frame is evaluated as to whether or not it belongs to this known set of random variables. To do so, a unique random variable (preferably a chi-square value) is formed from the set of random variables associated with the unknown frame. The unique variable is normalized with respect the known set of random variables and then classified as either speech or non-speech using the "Test of Hypothesis". Thus, each frame that belongs to the known set of random variables is classified as non-speech and each frame that does not belong to the known set of random variables is classified as speech.

10 Claims, 6 Drawing Sheets

SPEECH DETECTION USING STOCHASTIC CONFIDENCE MEASURES ON THE FREQUENCY SPECTRUM

BACKGROUND AND SUMMARY OF THE INVENTION

The present invention relates generally to speech detection systems, and more particularly, the invention relates to a method for detecting speech using stochastic confidence measures on frequency spectrums from a speech signal.

Speech recognition technology is now in wide use. Typically, speech recognition systems receive a time-varying speech signal representative of spoken words and phrases. These systems attempt to determine the words and phrases within the speech signal by analyzing components of the speech signal. As a first step, most speech recognition systems must first isolate those portions of the signal which convey spoken words from those non-speech portions of the signal. To this end, speech detection systems attempt to determine the beginning and ending boundaries of a word or group of words within the speech signal. Accurate and reliable determination of the beginning and ending boundaries of words or sentences poses a challenging problem, particularly when the speech signal includes background noise.

Speech detection systems generally rely on different kinds of information encapsulated in the speech signal to determine the location of an isolated word or group of words within the signal. A first group of speech detection techniques have been developed for analyzing the speech signal using time domain information of the signal. Typically, the intensity or amplitude of the speech signal is measured. Portions of the speech signal having an intensity greater than a minimum threshold are designated as being speech; whereas those portions of the speech signal having an intensity below the threshold are designated as being non-speech. Other similar techniques have been based on the detection of zero crossing rate fluctuations or the peaks and valleys inside the signal.

A second group of speech detection algorithms rely on signal information extracted out of the frequency domain. In these algorithms, the variation of the frequency spectrum is estimated and the detection is based on the frequency of this variation computed over successive frames. Alternatively, the variance of the energy in each frequency band is estimated and the detection of noise is based on when these variances go below a given threshold.

Unfortunately, these speech detection techniques have been unreliable, particularly where a variable noise component is present in the speech signal. Indeed, it has been estimated that many of the errors occurring in a typical speech recognition system are the result of an inaccurate determination of the location of the words within the speech signal. To minimize such errors, the technique for locating words within the speech signal must be capable of reliably and accurately locating the boundaries of the words. Further, the technique must be sufficiently simple and quick to allow for real time processing of the speech signal. The technique must also be capable of adapting to a variety of noise environments without any prior knowledge of the noise.

The present invention provides an accurate and reliable method for detecting speech from an input speech signal. A probabilistic approach is used to classify each frame of the speech signal as speech or non-speech. This speech detection method is based on a frequency spectrum extracted from each frame, such that the value for each frequency band is considered to be a random variable and each frame is considered to be an occurrence of these random variables. Using the frequency spectrums from a non-speech part of the speech signal, a known set of random variables is constructed. In this way, the known set of random variables is representative of the noise component of the speech signal.

Next, each unknown frame is evaluated as to whether or not it belongs to this known set of random variables. To do so, a unique random variable is formed from the set of random variables associated with the unknown frame. The unique variable is normalized with respect the known set of random variables and then classified as either speech or non-speech using the "Test of Hypothesis". Thus, each frame that belongs to the known set of random variables is classified as non-speech and each frame that does not belong to the known set of random variables is classified as speech. This method does not rely on any delayed signal.

For a more complete understanding of the invention, its objects and advantages refer to the following specification and to the accompanying drawings.

DETAILED DESCRIPTION OF THE PREFERRED EMBODIMENTS

Figure 1:
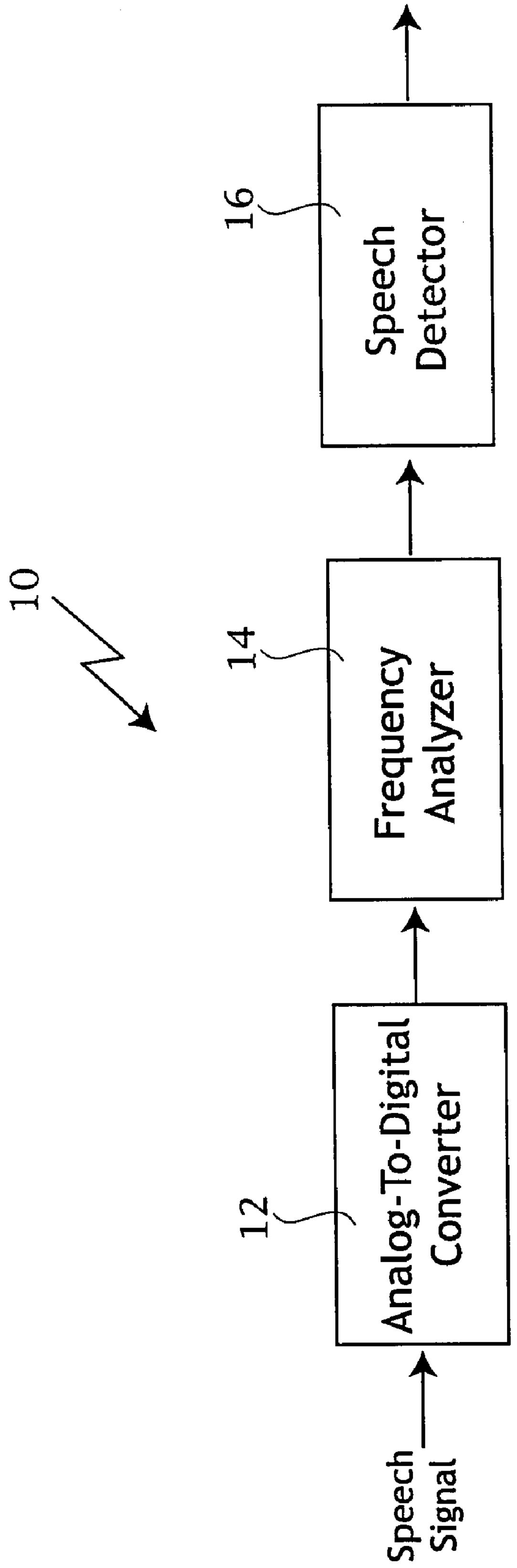
FIG. 1 is a block diagram illustrating the basic components of a speech detection system.

A speech detection system 10 is depicted in FIG. 1. Typically, an input speech signal is first digitally sampled by an analog-to-digital converter 12. Next, frequency domain information is extracted from the digitally sampled signal by a frequency analyzer 14. Lastly, the frequency domain information is used to detect speech within the signal in speech detector 16.

Figure 2:
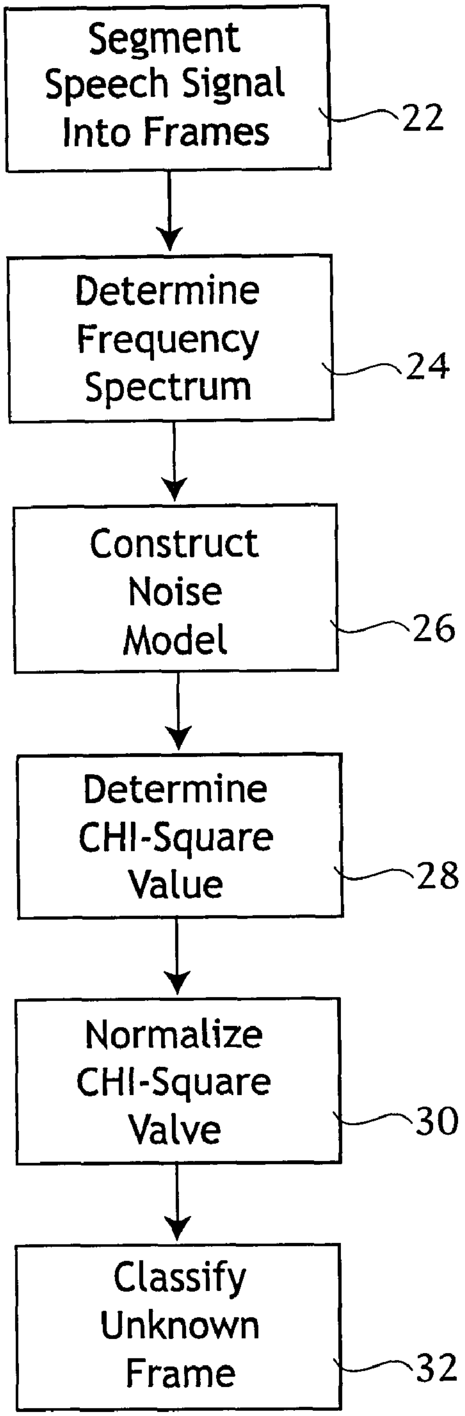
FIG. 2 is a flow diagram depicting an overview of the speech detection method of present invention.

FIG. 2 illustrates an accurate and reliable method for detecting speech from an input speech signal in accordance with the present invention. Generally, a probabilistic approach is used to classify each frame of the signal as either speech or non-speech. First, block 22 segments the speech signal into a plurality of frames. One skilled in the art will readily notice that such process can be done synchronously while recording the signal, in order not to have any delay in the speech detection process. Block 24 extracts frequency domain information from each frame, where the frequency domain information for each frequency band is considered to be a random variable and each frame is considered to be an occurrence of these random variables. Using the frequency domain information from a non-speech part of the signal, a known set of random variables is constructed in block 26. In this way, the known set of random variables is representative of the noise component of the speech signal.

Next, each unknown frame is evaluated as to whether or not it belongs to this known set of random variables. To do so, a unique random variable (e.g., a chi-square value) is formed in block 28 from the set of random variables associated with an unknown frame. The unique variable is normalized with respect the known set of random variables in block 30 and then classified as either speech or non-speech using the "Test of Hypothesis" in block 32. In this way, each frame that does not belong to the known set of random variables is classified as speech and each frame that does belong to the known set of random variables is classified as non-speech.

Figure 3A:
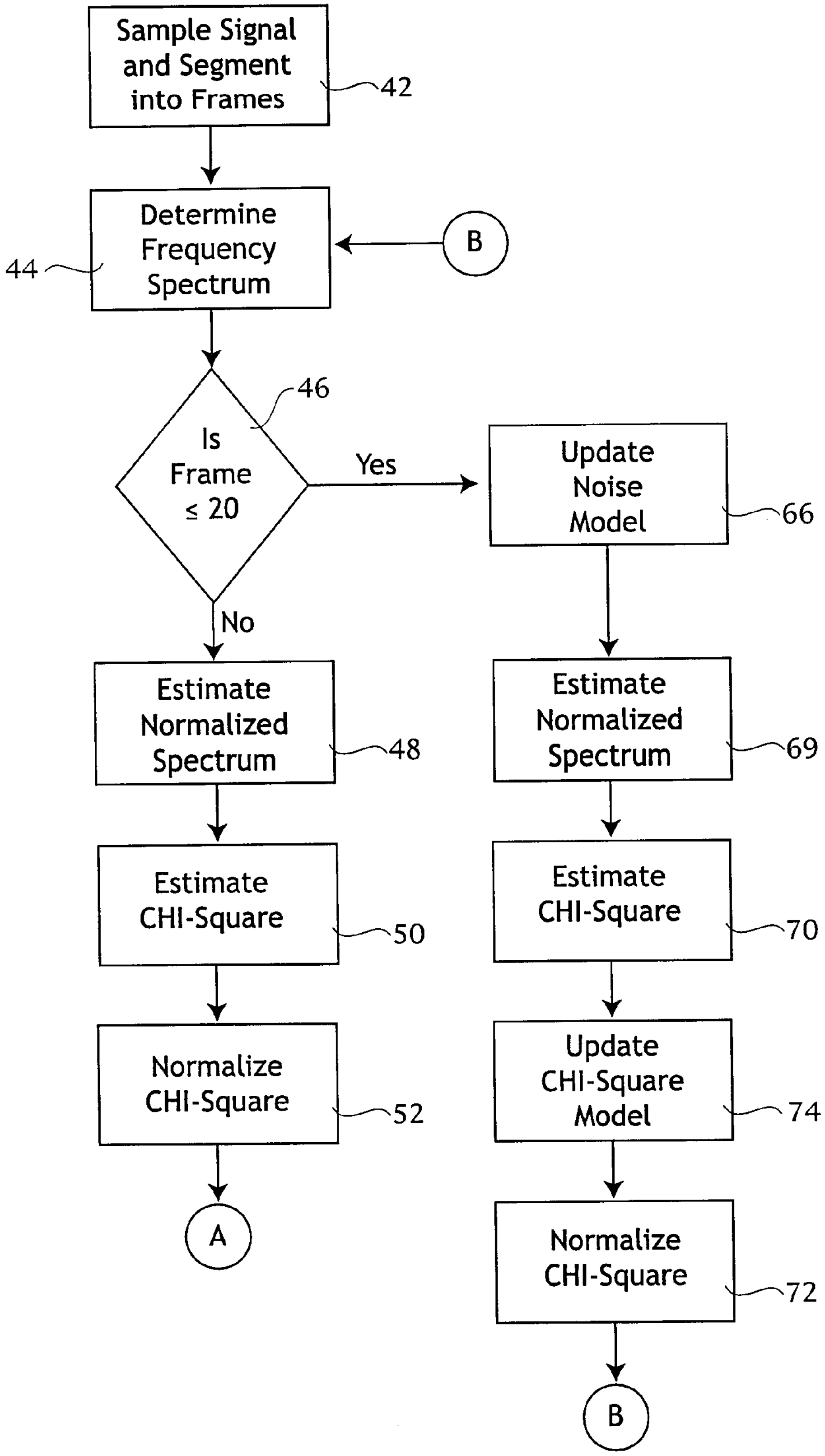
FIGS. 3A and 3B are detailed flow diagrams showing a preferred embodiment of the speech detection method of the present invention.
Figure 3B:
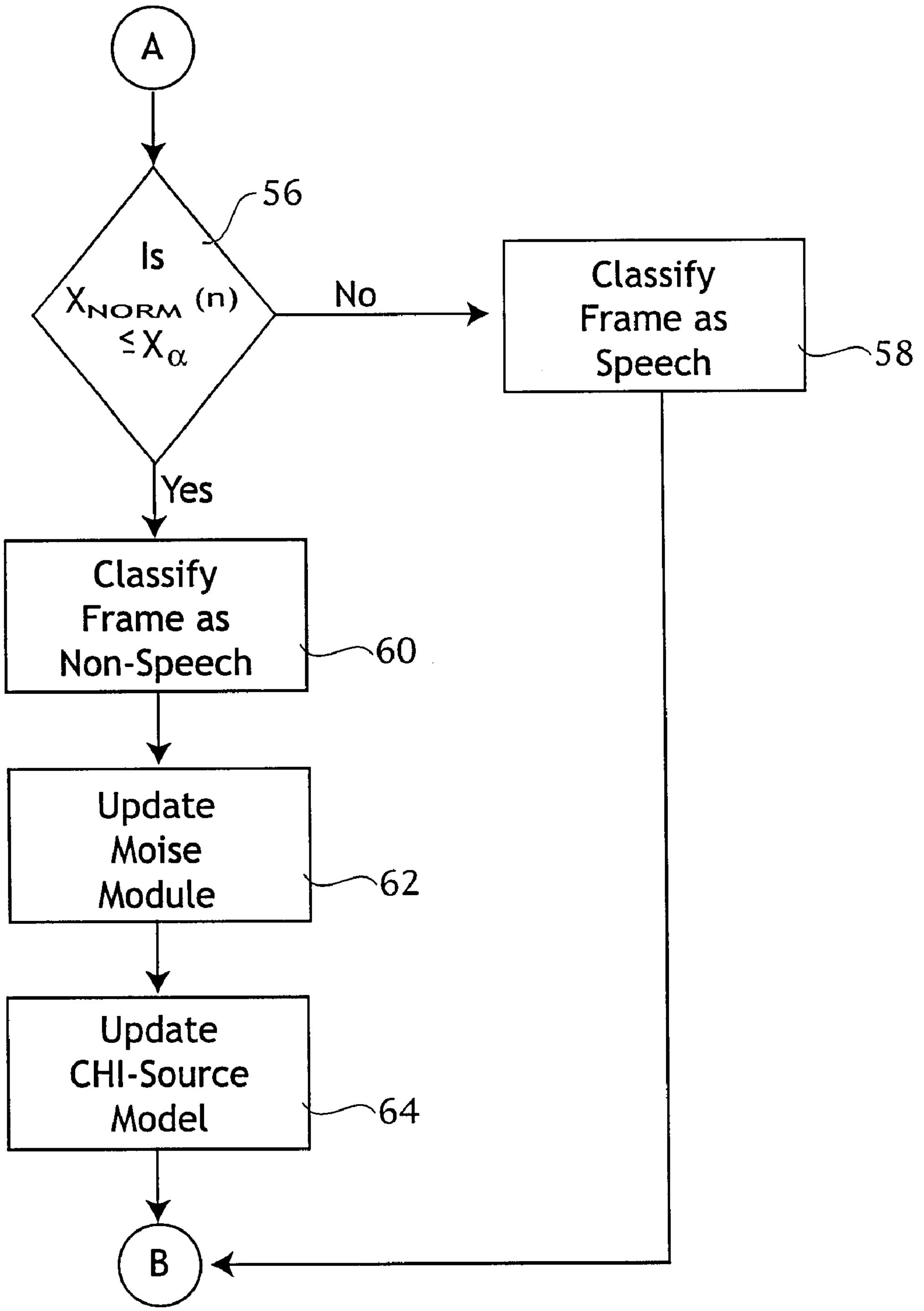

A more detailed explanation of the speech detection method of the present invention is provided in relation to FIGS. 3A and 3B. The analog signal corresponding to the speech signal (i.e., s(t)) is converted into digital form by an analog-to-digital converter as is well known in the art in block 42. The digital samples are then segmented into frames. Each frame must have a temporal definition. For illustration purposes, the frame is defined as a window signal w(n,t)=s(n*offset+t), where n=frame number and t=1, . . . , window size. As will be apparent to one skilled in the art, the frame should be large enough to provide sufficient data for frequency analysis, and yet small enough to accurately identify the beginning and ending boundaries of a word or group of words within the speech signal. In a preferred embodiment, the speech signal is digitally sampled at 8 k Hertz, such that each frame includes 256 digital samples and corresponds to 30 ms segments of the speech signal.

Next, a frequency spectrum is extracted out of each frame in block 44. Since noise usually occurs at specific frequencies, it is more interesting to represent the frames of the signals in their frequency domain. Typically, the frequency spectrum is formed by applying a fast Fourier transformation or other frequency analyzing technique to each of the frames. In the case a fast Fourier transformation, the frequency spectrum is defined as F(n,f)=FFT(w(n,t)), where n=frame number and f=1, . . . , F. Accordingly, the magnitude or energy content value for each of the frequency bands in a particular frame is defined as M(n,f)=abs(F(n,f)).

Using this frequency domain information from the speech signal, each of the frames are then classified as either speech or non-speech. As determined by decision block 46, at least the first ten frames of the signal (preferably 20 frames) are used to et a noise model as will be more fully explained below. The remaining frames of the signal are then classified as either speech or non-speech based upon a comparison with the noise model.

For each frame, the energy content value at each frequency band is normalized with respect to the noise model in block 48. These values are normalized according to:

$$M_{Norm}(n, f) = \frac{M(n, f) - \mu_N(f)}{\sigma_N(f)},$$

where $\mu_N$(f) and $\sigma_N$(f) are a mean and its corresponding standard deviation for the energy content values from the frames used to construct the noise model.

For each given frequency f, $M_{Norm}$(n,f) can be seen as the nth sample occurrence of a random variable, R(f), having a normal distribution. Assuming the normal distributions are independent, the set of random variables, R(f) has a chi-square distribution with F degrees of freedom. Thus, a chi-square value is computed in block 50 using the normalized values of the frame as follows:

$$X = \sum_{f=1}^{F} M_{Norm}(n, f)^2$$

In this way, the chi-square value extracts a single measure indicative of the frame.

Next, the chi-square value may be normalized in block 52 to further improve the accuracy of the speech detection system. When the degree of freedom F tends to ∞, the chi-square value tends to a normal distribution. In the present invention, since F is likely to exceed 30 (e.g., in the preferred case, F=256), the normalization of X(n), assuming the independence of hypothesis, is provided by:

$$X_{Norm} = \frac{X - F}{\sqrt{2F}},$$

where the mean and standard deviation of the chi-square value are estimated as $\mu_x$=F and $\sigma_x=\sqrt{2F}$, respectively.

Another preferred embodiment of the normalization of the chi-square is not to take into account the assumption of independence of the random variable, R(f) and to normalized X according to its own estimated mean and variance. To do so, it is assumed that X remains a chi-square random variable with it degrees of freedom unknown and yet high enough to keep a gaussian distribution approximation. This leads to an estimate of the mean $\mu_x$ and the standard deviation $\sigma_x$ for X (also referred to as the chi-square model), as follows:

$$\mu_X = \frac{\sum_{n \in N_{Noise}} X(n)}{\#(N_{Noise})} \text{ and } \sigma_X = \sqrt{\frac{\sum_{n \in N_{Noise}} (X(n) - \mu_X)^2}{\#(N_{Noise}) - 1}}$$

Normalizing X, as shown below, leads to a standard normal distribution:

$$X_{Norm}(n) = \frac{X(n) - \mu_x}{\sigma_x}$$

Each frame can then classified as either speech or non-speech by using the Test of Hypothesis. In order to test an unknown frame, the critical region becomes. $X_{Norm}(n) \leqq X_\alpha$. Since this is a unilateral test (i.e., the lower value cannot be rejected), α is the confidence level. By using the normal approximation of chi-square, the test is simplified to $X_{Norm}(n) \leqq X_\alpha$.

Figure 4:
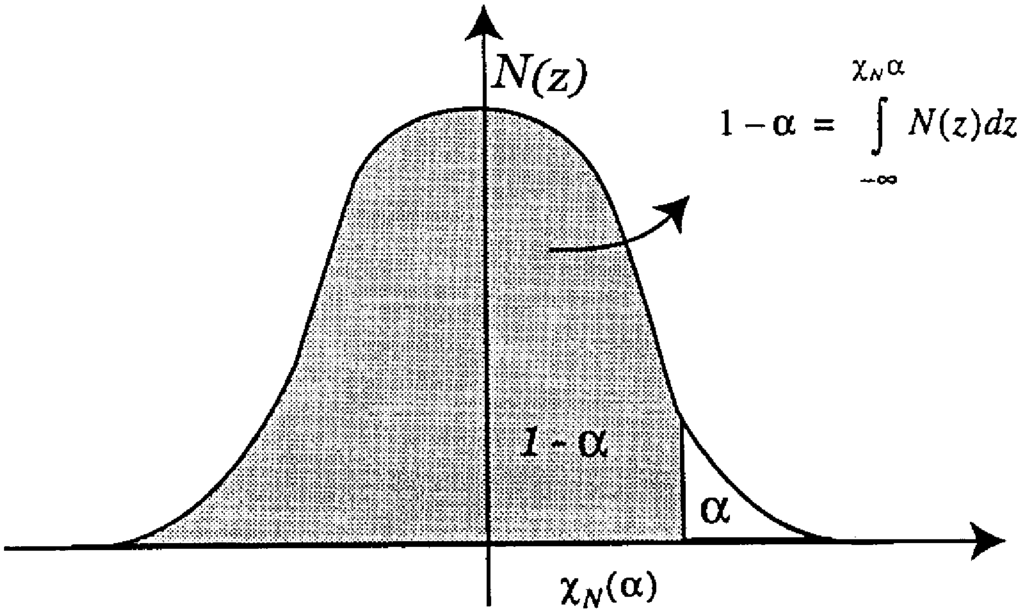
FIG. 4 illustrates the normal distribution of a chi-square measure.

$X_\alpha$ is such that the integral from $-\infty$ to $X_\alpha$ of the normal distribution is equal to $1-\alpha$ as shown in FIG. 4. Knowing that $$N(z) = \frac{1}{\sqrt{2\pi}} e^{\frac{1}{2}x^2}$$

and that the error function is defined as $$erf(z) = \frac{2}{\sqrt{\pi}} \int_o^z e^{-t^2} dt,$$

$1-\alpha$ is provided by:

$$1 - a = \frac{1 + erf\left(\frac{X_\alpha}{\sqrt{2}}\right)}{2}$$

By introducing the inverse function of the error function, x=erfinv(z), such that z=erf(x), a threshold value, $X_\alpha$, for use in the Hypothesis Test is preferably estimated as:

$$X_\alpha = \sqrt{2}\,\mathrm{erfinv}(1-2\alpha).$$

In this way, the threshold value can be predefined according to the desired accuracy of the speech detection system because it is only dependent on α. For instance, $X_{0.01}$=2.3262, $X_{0.01}$=1.2816, $X_{0.2}$=0.8416.

Referring to FIG. 3B, each unknown frame is classified in decision block 56, according to $X_{Norm}(n) \leqq X_\alpha$. When the normalized chi-square value for the frame is greater than the predefined threshold value, the frame is classified as speech as shown in block 58. When the normalized chi-square value for the frame is less than or equal to the predefined threshold value, the frame is classified as non-speech as shown in block 60. In either case, processing continues with the next unknown frame. Once an unknown frame has been classified as noise, it can also be used to re-estimate the noise model. Therefore, blocks 62 and 64 optionally update the noise model and update the chi-square model based on this frame.

Figure 5:
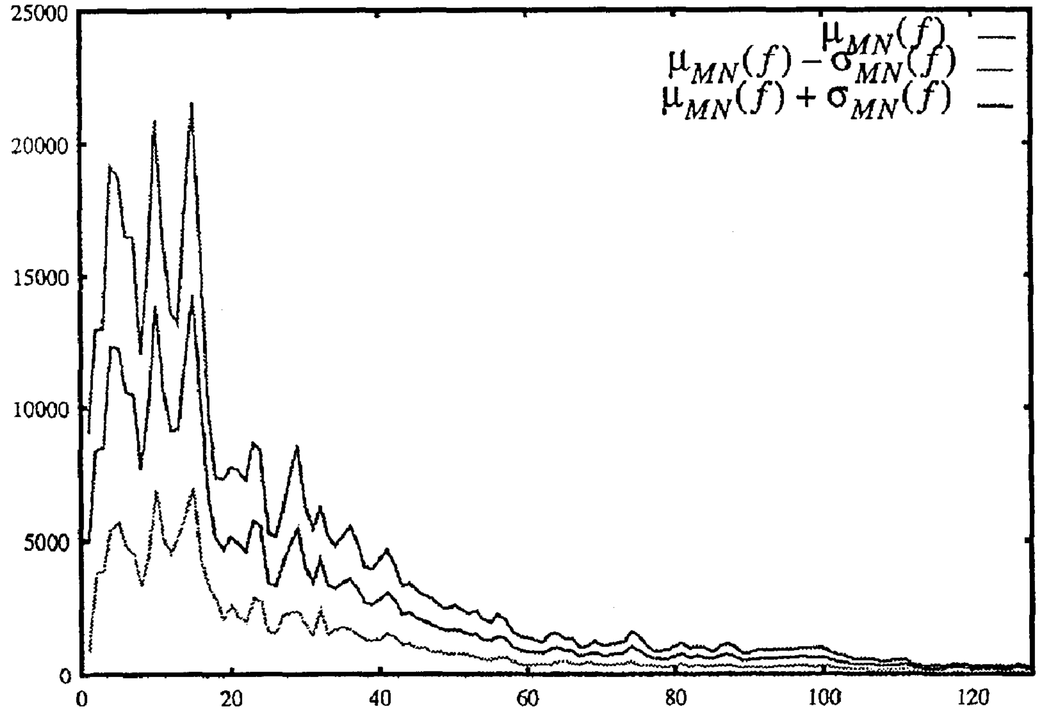
FIG. 5 illustrates a mean spectrum of noise (and its variance) over the first 100 frames of a typical input speech signal.

A noise model is constructed from the first frames of the input speech signal. FIG. 5 illustrates the mean spectrum of noise (and its variance) over the first 100 frames of a typical input speech signal. It is assumed that the first ten frames (but preferably twenty frames) of the speech signal do not contain speech information, and thus these frames are used to construct the noise model. In other words, these frames are indicative of the noise encapsulated throughout the speech signal. In the event that these frames do contain speech information, the method of the present invention incorporates an additional safeguard as will be explained below. It is envisioned that other parts of the speech signal that do not contain speech information could also be used to construct the model.

Returning to FIG. 3A, block 66 computes a mean $\mu_{N(f)}$ and a standard deviation $\sigma_{N(f)}$ of the energy content values at each of the frequency bands of these frame. For each of these first twenty frames, block 69 normalizes the frequency spectrum, block 70 computes a chi-square measure, block 72 updates $\mu_x$ and $\sigma_x$ of the chi-square model with $X_{Norm}$, and block 74 normalizes the chi-square measure. On skilled in the art will readily recognize that $X_{Norm}$ is needed when evaluating an unknown frame. Each of these steps are in accordance with the above-described methodology.

An over-estimation measure may be used to verify the validity the noise model. When there is speech present in the frames used to construct the noise model, an over-estimation of the noise spectrum occurs. This overestimation can be detected when a first "real" noise frame is analyzed by the speech detection system. To detect an over-estimation of the noise model, the following measure is used:

$$D(n) = \sum_f M_{Norm}(n, f)$$

This over-estimation measure uses the normalized spectrum to stay independent of the overall energy.

Generally, the chi-square measure is an absolute measure giving the distance from the current frame to the noise model, and therefore will be positive even if the current frame spectrum is lower than the noise model. However, the over-estimation measure will be negative when a "real" noise frame is analyzed by the speech detection system, thereby updating an overestimation of the noise model. In the preferred embodiment of the speech detection system, a successive number of frames (preferably three) having a negative value for the over-estimation measure will indicate an invalid noise model. In this case, the noise model may be re-initialized or speech detection may be discontinued for this speech signal.

The foregoing discloses and describes merely exemplary embodiments of the present invention. One skilled in the art will readily recognize from such discussion, and from accompanying drawings and claims, that various changes, modifications, and variations can be made therein without the departing from the spirit and scope of the present invention.

What is claimed is:

1. A method for detecting speech from an input speech signal, comprising the steps of:

sampling the input speech signal over a plurality of frames, each of the frames having a plurality of samples;

determining an energy content value, M(f), for each of a plurality of frequency bands in a first frame of the input speech signal;

normalizing each of the energy content values for the first frame with respect to energy content values from a non-speech part of the input speech signal;

determining a chi-square value for each of the normalized energy content values associated with the first frame; and comparing the chi-square value to a threshold value, thereby determining if the first frame correlates to the non-speech part of the input speech signal.

2. The method of claim 1 wherein the step of comparing the chi-square value further comprises using a predefined confidence interval to determine the threshold value.

3. The method of claim 1 wherein the threshold value is provided by $X_\alpha = \sqrt{2}\,\mathrm{erfinv}(1-2\alpha)$.

4. The method of claim 1 wherein the step of normalizing each of the energy content values further comprises the steps of:

determining an energy content value for each of a plurality of frequency bands in at least ten (10) frames at the beginning of the input signal, each of the ten frames being associated with the non-speech part of the input speech signal;

determining a mean value, $\mu_N(f)$, at each of the plurality of frequency bands for the energy content values associated with the ten frames of the non-speech part of the input speech signal; and determining a variance value, $\sigma_N(f)$, for each mean value associated with the ten frames of the non-speech part of the input speech signal, thereby constructing a noise model from the non-speech part of the input speech signal.

5. The method of claim 4 wherein the step of normalizing each of the energy content values is according to $$M_{Norm}(n, f) = \frac{M(n, f) - \mu_N(f)}{\sigma_N(f)}.$$

6. The method of claim 5 further comprises the step of using the first frame to verify the validity of the noise model.

7. The method of claim 6 wherein the step of using the unknown frame further comprises using an over-estimation measure according to $$D = \sum_f M_{Norm}(n, f).$$

8. The method of claim 1 further comprises the step of normalizing the chi-square value, X, for the unknown frame, prior to comparing the chi-square value to the threshold value, whereby the normalizing is according to $$X_{Norm} = \frac{X - F}{\sqrt{2F}},$$

where F is the degrees of freedom for the chi-square distribution.

9. The method of claim 1 further comprises the steps of:

determining chi-square values for each of the frames associated with the non-speech part of the input speech signal;

determining a mean value, $\mu_x$, and a variance value, $\sigma_x$, for the chi-square values associated with the non-speech part of the input speech signal; and normalizing the chi-square value for the first frame using the mean value and the variance value of the chi-square values, prior to comparing the chi-square value of the first frame to the threshold value.

10. The method of claim 9 wherein the step of normalizing the chi-square value is according to $$X_{Norm}(n) = \frac{X(n) - \mu_x}{\sigma_x}.$$

* * * * *